United States Patent
Hu

(10) Patent No.: US 12,438,930 B2
(45) Date of Patent: Oct. 7, 2025

(54) STREAMING MEDIA TRANSMISSION METHOD AND APPARATUS, ELECTRONIC DEVICE, AND COMPUTER- READABLE STORAGE MEDIUM

(71) Applicant: Tencent Technology (Shenzhen) Company Limited, Guangdong (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 22 days.

(21) Appl. No.: 18/500,685

(22) Filed: Nov. 2, 2023

(65) Prior Publication Data

US 2024/0205283 A1  Jun. 20, 2024

Related U.S. Application Data

(63) Continuation of application No. PCT/CN2022/137754, filed on Dec. 9, 2022.

(30) Foreign Application Priority Data

Jan. 10, 2022 (CN) .......... 202210022663.8

(51) Int. Cl.
*H04L 65/612* (2022.01)
*H04L 65/75* (2022.01)

(52) U.S. Cl.
CPC .......... *H04L 65/612* (2022.05); *H04L 65/762* (2022.05)

(58) Field of Classification Search
CPC ..... H04L 65/60; H04L 65/612; H04L 65/762; H04L 65/80
See application file for complete search history.

(56) References Cited

U.S. PATENT DOCUMENTS 5,933,567 A    8/1999  Lane et al.
8,565,228 B1  10/2013  Howard
(Continued)

FOREIGN PATENT DOCUMENTS

CN    102130886 A    7/2011
CN    108900804 A   11/2018

OTHER PUBLICATIONS

International Search Report of PCT/CN2022/137754 dated Feb. 14, 2023 [PCT/ISA/210].
(Continued)

*Primary Examiner* — June Sison
(74) *Attorney, Agent, or Firm* — Sughrue Mion, PLLC

(57) ABSTRACT

A streaming media transmission method and apparatus are provided. The method may include: parsing streaming media transmission signaling to obtain a ranking relationship descriptor of each streaming media object.) The method may further include forming a ranking relationship set with at least two streaming media objects having the same ranking identifier field. The method may further include ranking the at least two streaming media objects in the ranking relationship set according to the ranking information field to obtain a streaming media object sequence. The method may further include selecting a to-be-received target streaming media object from the streaming media object sequence, and transmitting a streaming media transmission request for the target streaming media object, the streaming media transmission request being used for requesting to acquire the target streaming media object.

20 Claims, 7 Drawing Sheets

(56) References Cited

U.S. PATENT DOCUMENTS

2014/0143385 A1     5/2014    Neff et al.
2019/0238933 A1*   8/2019    Di .......................... H04N 21/65
2020/0053435 A1*   2/2020    Denoual .......... H04N 21/23439
2021/0409998 A1    12/2021    Kwok et al.
2022/0038791 A1*   2/2022    Curcio ............. H04N 21/23109

OTHER PUBLICATIONS

Written Opinion of PCT/CN2022/137754 dated Feb. 14, 2023 [PCT/ISA/237].

* cited by examiner

ABSTRACTSTREAMING MEDIA TRANSMISSION
METHOD AND APPARATUS, ELECTRONIC
DEVICE, AND COMPUTER- READABLE
STORAGE MEDIUM

CROSS REFERENCE TO RELATED
APPLICATION

This application is a continuation of International Application No. PCT/CN2022/137754, filed on Dec. 9, 2022 claims priority to Chinese Patent Application No. 202210022663.8, filed on Jan. 10, 2022, the contents of which are incorporated by reference herein in their entirety.

FIELD

Embodiments of the disclosure belong to the field of audio/video technologies, and specifically relate to a streaming media transmission method and apparatus, an electronic device, a computer-readable storage medium, and a computer program product.

BACKGROUND

Streaming media is a technology and process of compressing a series of media data, transmitting the data online segment by segment, and instantly transmitting audio/video online for viewing. The technology enables data packets to be transmitted as running water. Due to the characteristic of real-time transmission of streaming media segment by segment, a user may obtain media data in real time without downloading a complete media file, which, however, imposes high requirements on device performance of the user and network conditions. In case of degraded device performance or an unsatisfactory network status, transmission of media data will be hindered. Therefore, transmission of streaming media generally has problems such as low transmission efficiency and poor stability.

SUMMARY

The disclosure is intended to provide a streaming media transmission method and apparatus, an electronic device, a computer-readable storage medium, and a computer program product.

According to an aspect of embodiments of the disclosure, a streaming media transmission method is provided. The method is performed by at least one processor and may include: parsing streaming media transmission signaling to obtain a ranking relationship descriptor of each streaming media object, the ranking relationship descriptor including a ranking identifier field and a ranking information field, the ranking identifier field being used for representing a ranking range, and the ranking information field being used as a ranking basis. The method may further include forming a ranking relationship set with at least two streaming media objects having the same ranking identifier field. The method may further include ranking the at least two streaming media objects in the ranking relationship set according to the ranking information field to obtain a streaming media object sequence; and selecting a to-be-received target streaming media object from the streaming media object sequence, and transmitting a streaming media transmission request for the target streaming media object, the streaming media transmission request being used for requesting to acquire the target streaming media object.

According to other aspects of one or more embodiments, there is also provided an apparatus and non-transitory computer readable medium consistent with the method

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DETAILED DESCRIPTION

Figure 1:
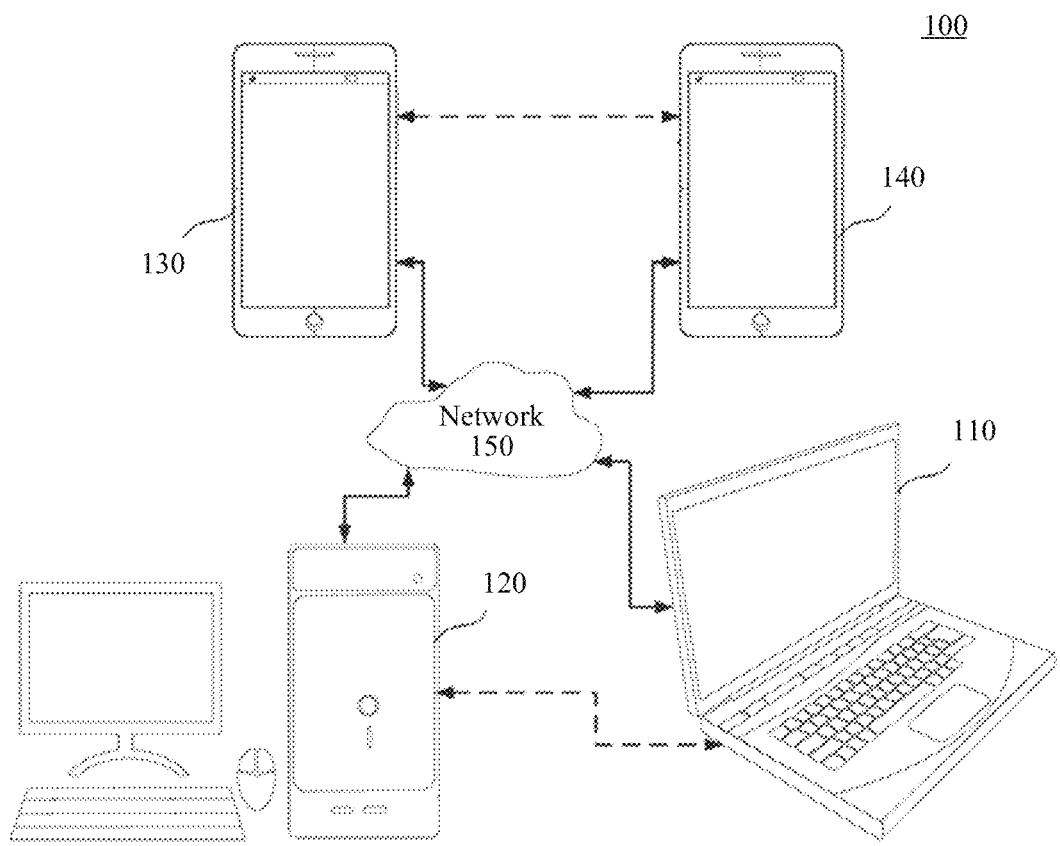
FIG. 1 is a schematic diagram of an exemplary system architecture, according to some embodiments.

Exemplary implementations will be described more thoroughly with reference to the drawings. However, the exemplary implementations may be implemented in many forms and are to be understood as being limited to examples described herein Rather, these implementations are provided to make the disclosure more comprehensive and complete, and comprehensively convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of the disclosure. However, a person of ordinary skill in the art is to be aware that, the technical solutions in the disclosure may be implemented without one or more of the particular details, or another method, unit, apparatus, or operation may be used. In other cases, well-known methods, apparatuses, implementations, or operations are not shown or described in detail, in order not to obscure the aspects of the disclosure.

The block diagrams shown in the drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the drawings are merely exemplary descriptions, do not necessarily need to include all content and operations, and do not necessarily need to be performed in the described orders either. For example, some operations may be further divided, while some operations may be combined or partially combined. Therefore, an actual execution order may change according to an actual case.

"A plurality of" in the description means two or more. "And/or" describes an association relationship for describing associated objects and indicates that three relationships may exist. For example, A and/or B may represent the following three cases: Only A exists, both A and B exist, and only B exists. The character "/" generally indicates that the associated objects at front and rear are in an "or" relationship.

The specific implementations of the disclosure involve user related data such as streaming media resources. When each implementation of the disclosure is applied to specific products or technologies, user permission or consent is required, and the collection, use, and processing of relevant data need to comply with relevant laws, regulations, and standards of relevant countries and regions.

Explanations of the relevant terms or abbreviations involved in the embodiments of the disclosure are as follows.

DASH: dynamic adaptive streaming over hyper text transfer protocol (HTTP), which is an adaptive bitrate streaming technology that enables high-quality streaming media to be transmitted over the Internet through a conventional HTTP network server.

MPD: media presentation description, which is media presentation description signaling in the DASH, and is configured to describe media clip information.

Representation: a combination of one or more media components in the DASH. For example, a video file with a specific resolution may be considered as a representation.

Adaptation sets: a set of one or more video streams in the DASH. One adaptation set may include a plurality of representations.

Multi-perspective/multi-view video: a video with depth information captured from a plurality of angles by using a plurality of camera arrays. The multi-perspective/multi-view video is also referred to as free-perspective/free-view video, which is immersive media providing experience of six degrees of freedom.

Point cloud: Point cloud is a set of randomly distributed discrete points in space that express the spatial structure and surface attributes of a three-dimensional object or scenario. Each point in the point cloud has at least three-dimensional position information, and may further have information about a color or a material depending on an application scenario. Usually, the points in the point cloud have the same number of additional attributes.

V3C media: visual volumetric video-based coding media, which are immersive media captured from three-dimensional spatial visual content, providing 3DoF+ and 6DoF viewing experience, using conventional video coding, and including volumetric video tracks in a file encapsulation, and include multi-perspective videos, video coding point cloud, and the like.

DoF: degree of freedom. In the disclosure, DoF is a degree of freedom by which a user may move while watching immersive media and generate content interaction.

3DoF: three degrees of freedom, which are three degrees of freedom by which a user's head rotates about x, y, and z axes.

3DoF+: which means that a user further has limited degrees of freedom for movement along the x, y, and z axes based on three degrees of freedom.

6DoF: which means that a user further has non-limited degrees of freedom for movement along the x, y, and z axes based on three degrees of freedom.

FIG. 1 is a schematic diagram of an exemplary system architecture to which a technical solution in an embodiment of the disclosure is applicable.

As shown in FIG. 1, a system architecture 100 includes a plurality of terminal apparatuses. The terminal apparatuses may communicate with each other through a network 150, for example. For example, the system architecture 100 may include a first terminal apparatus 110 and a second terminal apparatus 120 connected through the network 150. In the embodiment of FIG. 1, the first terminal device 110 and the second terminal device 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bitstreams. The second terminal apparatus 120 may receive the coded video data through the network 150, decode the coded video data to recover the video data, and display a video picture according to the recovered video data.

In some embodiments of the disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, the third terminal apparatus 130 may code video data (for example, a video picture stream captured by the third terminal apparatus) and transmit the coded video data to the fourth terminal apparatus 140 through the network 150. The third terminal apparatus 130 may further receive coded video data transmitted by the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in the disclosure may not be limited thereto. The embodiments disclosed in the disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in circuit switching and/or packet switching channels. The network may include a telecommunication network, a local area network, a wide area network, and/or the Internet. For the purposes of the disclosure, unless explained below, an architecture and a topology of network 150 may be immaterial to the operations disclosed in the disclosure.

The server in the embodiments of the disclosure may be an independent physical server, or may be a server cluster including a plurality of physical servers. The terminal may be a smartphone, a tablet computer, a notebook computer, a desktop computer, a smart speaker, a smartwatch, an on-board terminal, a smart television, or the like, but is not limited thereto. The terminal and the server may be directly or indirectly connected through wired or wireless communication, which is not limited in the disclosure.

Figure 2:
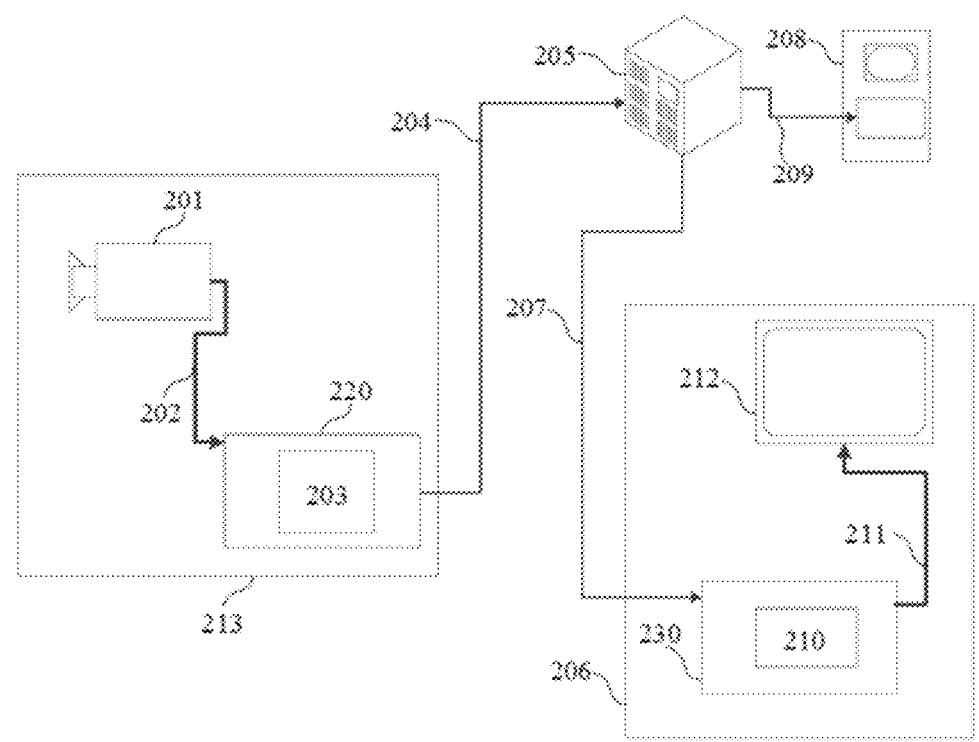
FIG. 2 shows a placement mode of a video coding apparatus and a video decoding apparatus in a streaming transmission environment, according to some embodiments.

In some embodiments of the disclosure, FIG. 2 shows a placement mode of a video coding apparatus and a video decoding apparatus in a streaming transmission environment. The subject disclosed in the disclosure may be comparably applicable to other video-enabled applications, including, for example, a video conference, a digital television (TV), and storage of compressed videos on digital media including a CD, a DVD, and a memory stick.

A streaming transmission system includes a capture subsystem 213. The capture subsystem 213 may include a video source 201 such as a digital camera. The video source 201 creates an uncompressed video picture stream 202. In the embodiments, the video picture stream 202 includes a sample captured by the digital camera. Compared with coded video data 204 (or a coded video bitstream 204), the video picture stream 202 is depicted by a thick line to emphasize the video picture stream with a large data volume. The video picture stream 202 may be processed by an electronic device 220. The electronic device 220 includes a video coding apparatus 203 coupled to the video source 201. The video coding apparatus 203 includes hardware, software, or a combination of hardware and software to realize or implement the aspects of the disclosed subject matter described in more detail below. Compared with the video picture stream 202, the coded video data 204 (or the coded video bitstream 204) is depicted by a thin line to emphasize the coded video data 204 (or the coded video bitstream 204) with a small data volume, which may be stored in a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the coded video data 204. The client subsystem 206 includes an electronic device 230, and the electronic device 230 includes a video decoding apparatus 210. The video decoding apparatus 210 decodes the received copy 207 of the coded video data, and generates an output video picture stream 211 that may be presented on a display 212 (for example, a display screen) or another display apparatus. In some streaming transmission systems, the coded video data 204, the coded video data 207, and the coded video data 209 (for example, the video bitstream) may be coded according to the video coding/compression standards. Examples of standards that may be used include ITU-TH.265 and the like.

The electronic device 220 and the electronic device 230 may include other components not shown in the figure. For example, the electronic device 220 may include a video decoding apparatus, and the electronic device 230 may further include a video coding apparatus.

In some embodiments of the disclosure, international video coding standards such as high efficiency video coding (HEVC) and the versatile video coding (VVC) and the Chinese national video coding standard such as the audio video coding standard (AVS) are used as examples. When a video image frame is inputted, the video image frame is partitioned into a plurality of non-overlapping to-be-processed units according to a block size, and similar compression operations are performed on the to-be-processed units. Each of the to-be-processed unit is referred to as a coding tree unit (CTU) or a largest coding unit (LCU). The CTU may be further partitioned more finely to obtain one or more basic coding units (CU). Each of the CUs is the most basic element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. A coder end needs to select a predictive coding mode for a current CU and notifies a decoder end of the mode. The intra prediction means that a predicted signal comes from a region in a same image that has been coded and reconstructed. The intra prediction means that a predicted signal comes from another coded image (referred to as a reference image) that is different from a current image.

Transform & quantization: A residual video signal is transformed into a transform domain through a transform operation such as discrete Fourier transform (DFT) or discrete cosine transform (DCT), to generate a transform coefficient. A lossy quantization operation is further performed on the transform coefficient, which loses a specific amount of information, so that the quantized signal facilitates compressed expression. In some video coding standards, there may be more than one transform mode for selection. Therefore, the coder end needs to select a transform mode for the current CU and notifies the decoder end of the mode.

Entropy coding or statistical coding: Statistical compression coding is performed on the quantized signal in the transform domain according to a frequency of occurrence of each value, and finally a binarized (0 or 1) compressed bitstream is outputted. In addition, entropy coding further needs to be performed on other information generated during the coding, such as the selected coding mode and motion vector data, to reduce a bit rate. Statistical coding is a lossless coding mode that may effectively reduce a bit rate required for expressing a same signal. A common statistical coding mode includes variable length coding (VLC for short) or context adaptive binary arithmetic coding (CABAC for short).

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image has distortion. Therefore, a filtering operation may be performed on the reconstructed image by using filters such as a deblocking filter (DB for short), a sample adaptive offset (SAO) filter, or an adaptive loop filter (ALF), which may effectively reduce a degree of distortion caused by quantization. Since the filtered reconstructed image will be used as a reference for subsequently coding images so as to predict future image signals, the above filtering operation is also referred to as loop filtering, that is, a filtering operation in a coding loop.

Figure 3:
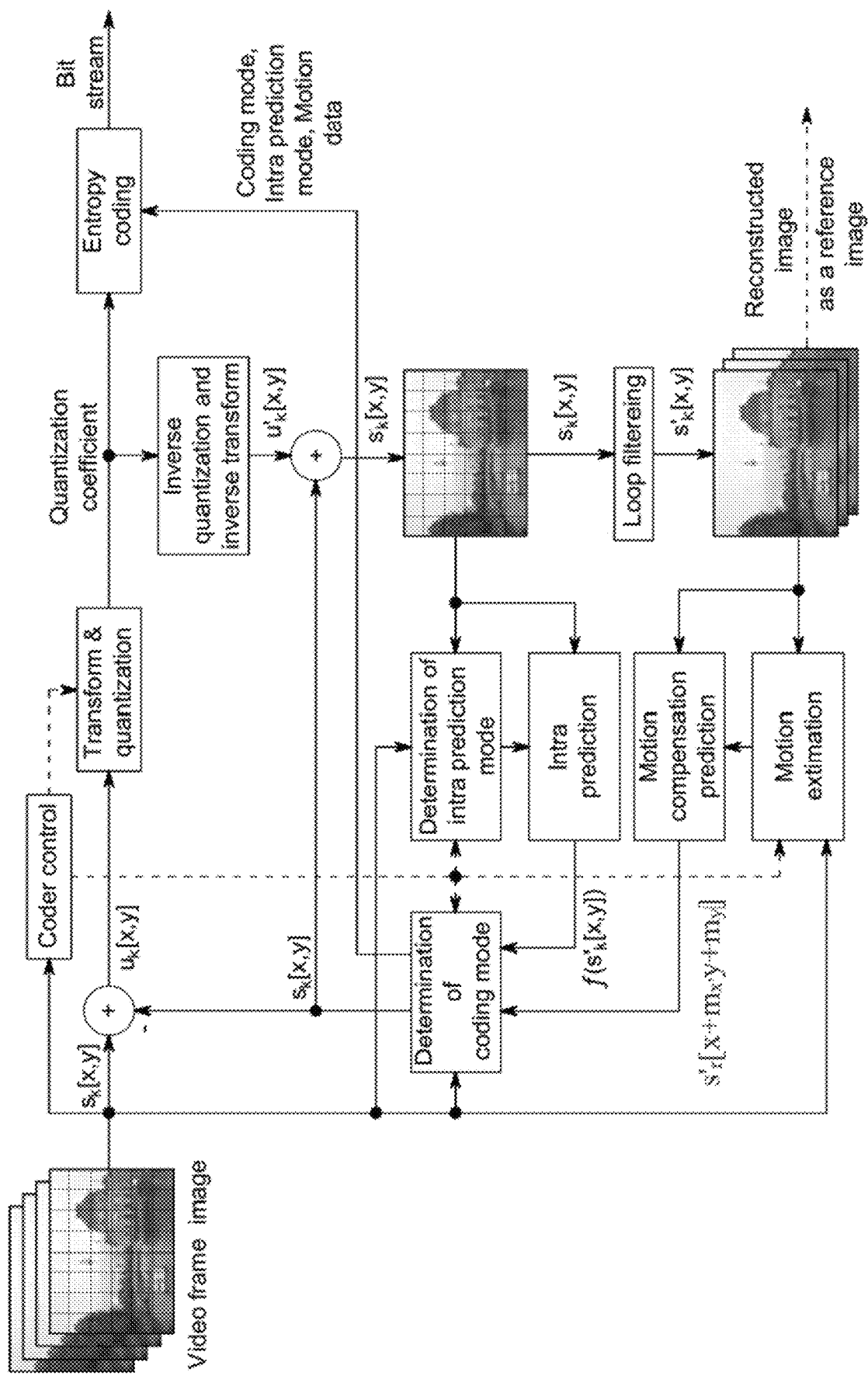
FIG. 3 is a basic flowchart of a video coder, according to some embodiments.

In some embodiments of the disclosure, FIG. 3 is a basic flowchart of a video coder. In this process, intra prediction is used as an example for description. First, a difference between an original image signal and a predicted image signal is calculated to obtain a residual signal. Then, the residual signal is transformed and quantized to obtain a quantization coefficient, a coded bitstream corresponding to the quantization coefficient is obtained through entropy coding, and a reconstructed residual signal corresponding to the quantization coefficient is obtained through inverse quantization and inverse transformation. The predicted image signal and the reconstructed residual signal are superimposed to generate an image signal. The image signal is inputted into an intra mode decision module and an intra prediction module for intra prediction, to obtain an intra prediction result. Loop filtering is performed on the image signal to obtain a reconstructed image signal. The reconstructed image signal is used as a reference image of a next frame for motion estimation and motion compensation prediction. Motion compensation prediction is performed based on the reconstructed image signal to obtain a result of the motion compensation prediction. A predicted image signal of the next frame is obtained based on the result of the motion compensation prediction and the intra prediction. The above process is repeated until the coding is completed.

Based on the above coding process, for each CU, entropy decoding is performed on a compressed bitstream (that is, a bitstream) of the CU to obtain various mode information and quantization coefficients on the decoder end after the compressed bitstream is acquired. Then, inverse quantization and inverse transformation are performed on the quantization coefficients to obtain a residual signal. In addition, a predicted signal corresponding to the CU is obtained based on the known coding mode information. Finally, the residual signal and the predicted signal are added up to obtain a reconstructed signal. Then operations such as loop filtering is performed on the reconstructed signal to generate a final output signal.

In a video transmission technology, a streaming transmission technology is usually used for transmission of media resources between servers and clients. Common media streaming transmission technologies include DASH, HTTP live streaming (HLS, a streaming media network transport protocol based on HTTP), smart media transport (SMT), and the like.

The DASH is used as an example. The DASH is an adaptive bitrate streaming technology that enables high-quality streaming media to be transmitted over the Internet through a conventional HTTP network server. In the DASH, a content is split into a series of small HTTP-based file clips, each clip includes a playable content with a very short length, and a total length of the content may be up to a plurality of hours (such as a movie or a sports event live broadcast). The content is formed into alternative clips of a plurality of bit rates to provide a plurality of bit rate versions for selection. When the media content is played by a DASH client, the client automatically selects an alternative for downloading and playing based on a current network status. The client selects a clip of the highest bit rate that may be downloaded in a timely manner for playback, so as to avoid playback lag or re-buffering. Therefore, the DASH client may seamlessly adapt to the constantly changing network status and provide high-quality playback experience with less lag and re-buffering.

The DASH uses the existing HTTP network server infrastructure. In this way, devices such as Internet TVs, TV set-top boxes, desktop computers, smartphones, and tablet computers are allowed to consume the multimedia content transmitted through the Internet (such as videos, televisions, and broadcasts), and may cope with changing Internet reception conditions.

The emerging media resource playback scenarios have higher requirements for the transmission of streaming media data through the network. An embodiment of the disclosure provides a method for indicating information such as quality and a priority of the streaming media data. Through the method provided in this embodiment of the disclosure, related information such as quality and a priority of the streaming media data within a specific range may be flexibly defined and indicated, thereby enabling the client to request corresponding streaming media data according to a demand.

The various technical solutions of the embodiments of the disclosure in the readable storage medium may be applied to a server side, a player side, and an intermediate node of the streaming media transmission system.

Figure 4:
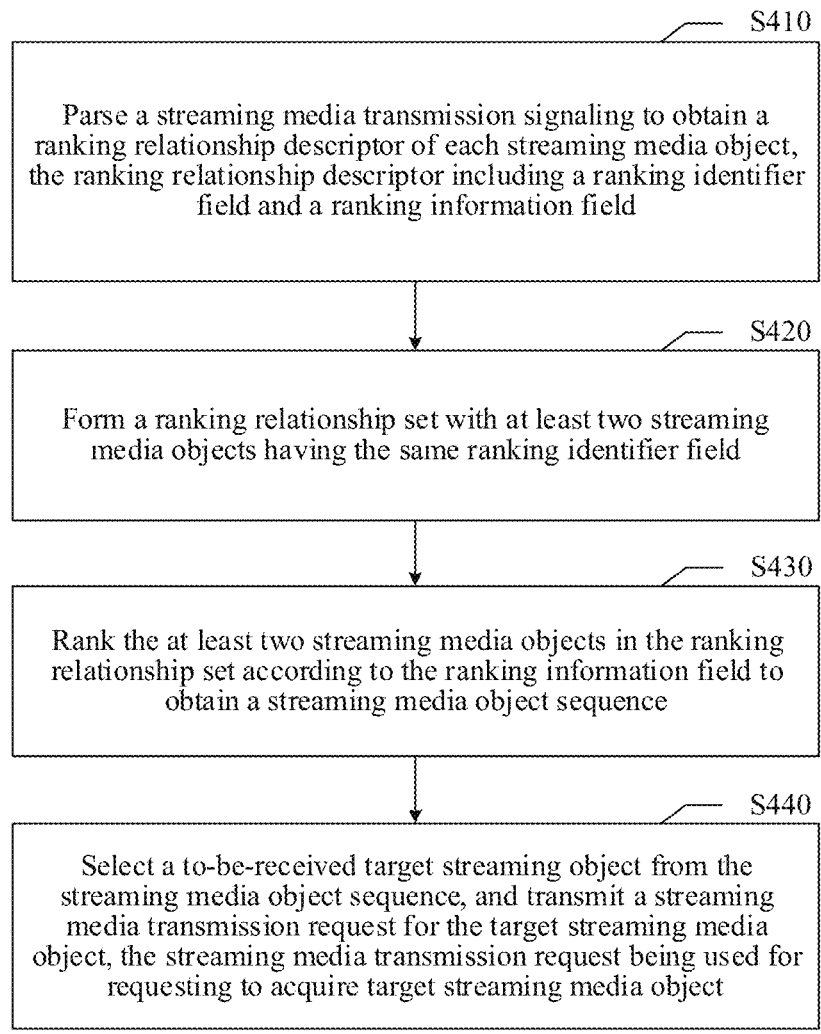
FIG. 4 is a flowchart of operations of a streaming media transmission method executed by a decoder side, according to some embodiments.

FIG. 4 is a flowchart of operations of a streaming media transmission method executed by a decoder side according to some embodiments of the disclosure. The decoder side may be understood as a data receiver receiving streaming media data, and the method may be applied to a terminal device of a user or to an intermediate node for data communication between a server and a terminal device.

As shown in FIG. 4, the streaming media transmission method may include the following operation S410 to operation S440.

Operation S410: Parse streaming media transmission signaling to obtain a ranking relationship descriptor of each streaming media object, the ranking relationship descriptor including a ranking identifier field and a ranking information field, the ranking identifier field being used for representing a ranking range, and the ranking information field being used as a ranking basis.

The streaming media transmission signaling is a message transmitted between a data sender and a data receiver to coordinate the communication process. For example, the streaming media transmission signaling may be DASH signaling based on the DASH protocol or SMT signaling.

The ranking relationship descriptor is used for defining quality ranking information, priority ranking information, or ranking information of other dimensions between different streaming media objects. The ranking relationship descriptor may be defined with different elements in different types of signaling. For example, in the DASH signaling, the ranking relationship descriptor may be defined as an element RankingRelationship, and in the SMT signaling, the ranking relationship descriptor may be defined as an element Ranking_set_descriptor.

In this embodiment of the disclosure, the data receiver may obtain the ranking relationship descriptor of each streaming media object by parsing the streaming media transmission signaling, the ranking relationship descriptor including the ranking identifier field and the ranking information field, may group each streaming media object to at least one ranking range based on the ranking identifier field, and may rank, for each of the at least one ranking range, the streaming media objects within the ranking range based on the ranking information field.

Operation S420: Form a ranking relationship set with at least two streaming media objects having the same ranking identifier field.

The streaming media transmission signaling carries ranking relationship descriptors of a plurality of streaming media objects. The data receiver may determine the ranking relationship among the streaming media objects by comparing the ranking relationship descriptors. The ranking relationship includes two aspects: a ranking range and a ranking position. The ranking range is determined according to the ranking identifier field in the ranking relationship descriptor. When any two streaming media objects have the same ranking identifier field, it indicates that the two streaming media objects belong to the same ranking range. Streaming media objects within the same ranking range may be grouped into a ranking relationship set. For example, if ranking identifier fields of a streaming media object A and a streaming media object B both have a value of 1, and ranking identifier fields of a streaming media object C and a streaming media object D both have a value of 2, the streaming media object A and the streaming media object B may form a ranking relationship set, and the streaming media object C and the streaming media object D may form another ranking relationship set.

In some embodiments of the disclosure, one streaming media object may have one ranking relationship descriptor. In this case, the streaming media object may have one ranking identifier field. Based on the ranking identifier field of the streaming media object, the streaming media object may be grouped into a ranking relationship set corresponding to the ranking identifier field.

In some embodiments of the disclosure, one streaming media object may also have a plurality of different ranking relationship descriptors, and the ranking identifier fields of the ranking relationship descriptors may include the same value or different values. In a case that the values of the ranking identifier fields included in each ranking relationship descriptor are not exactly the same, the streaming media object has at least two ranking identifier fields with different values. Therefore, the streaming media object may be grouped into ranking relationship sets corresponding to the at least two ranking identifier fields with the different values. Combination object.

For example, the streaming media object A may have two ranking relationship descriptors (such as a ranking relationship descriptor 1 and a ranking relationship descriptor 2), the ranking identifier field included in the ranking relationship descriptor 1 has a value of 1, and the ranking identifier field included in the ranking relationship descriptor 2 has a value of 2. In this case, the streaming media object A may be grouped into the ranking relationship set 1 corresponding to the ranking identifier field with the value of 1, and the streaming media object A may be grouped into the ranking relationship set 2 corresponding to the ranking identifier field with the value of 2.

Operation S430: Rank the at least two streaming media objects in the ranking relationship set according to the ranking information field to obtain a streaming media object sequence.

At least two streaming media objects are distributed in the same ranking relationship set. The data receiver may rank the at least two streaming media objects distributed in the ranking relationship set according to the values of the ranking information fields, to obtain a streaming media object sequence arranged in specified order. In some embodiments of the disclosure, the data receiver may rank the at least two streaming media objects in the ranking relationship set in ascending order of the values of the ranking information fields, or may rank the at least two streaming media objects in the ranking relationship set in descending order of the values of the ranking information fields.

In some embodiments of the disclosure, the ranking information field may include at least one of quality ranking information, priority ranking information, or undefined ranking information, the quality ranking information being used for representing a ranking level of the streaming media object ranked according to streaming media quality, the priority ranking information being used for representing a ranking level of the streaming media object ranked according to a selection priority, and the undefined ranking information being used for representing a ranking level of the streaming media object ranked according to a specified rule. The specified rule may be configured according to an actual application scenario.

In this embodiment, by providing the plurality of ranking information fields for selection, the ranking flexibility and diversity of the streaming media object may be improved, thereby providing diversified solutions for the transmission of the streaming media objects through the network, ensuring the transmission stability and reliability of the streaming media data, and improving the transmission efficiency of the streaming media data.

In some embodiments of the disclosure, the ranking information field may include one piece of specified information of the quality ranking information, the priority ranking information, or the undefined ranking information, or may include two or more pieces of specified information.

In some embodiments of the disclosure, the data receiver may rank the at least two streaming media objects in the ranking relationship set according to the same type of specified information, or may comprehensively rank the at least two streaming media objects in the ranking relationship set according to a plurality of types of specified information.

Operation S440: Select a to-be-received target streaming media object from the streaming media object sequence, and transmit a streaming media transmission request for the target streaming media object, the streaming media transmission request being used for requesting to acquire the target streaming media object.

In some embodiments of the disclosure, the data receiver may select, from the streaming media object sequence, an object satisfying a data demand as the to-be-received target streaming media object. The to-be-received target streaming media object may be a single streaming media object or all streaming media objects in a combination object. For example, when the device performance of the data receiver and the network status are desirable, a streaming media object ranked high in terms of quality or priority may be preferentially selected as the to-be-received target streaming media object. When the device performance of the data receiver or the network status is poor, a streaming media object ranked low in terms of quality or priority may be selected as the to-be-received target streaming media object.

After the to-be-received target streaming media object is selected, the data receiver may transmit a streaming media transmission request for the target streaming media object to the data sender. After receiving the streaming media transmission request, the data sender may transmit the corresponding target streaming media object to the data receiver according to the demand of the data receiver.

According to the streaming media transmission method provided in this embodiment of the disclosure, the streaming media objects are grouped into a plurality of different ranking ranges, and the streaming media objects are ranked according to different ranking bases within a specific ranking range, which may improve the ranking flexibility and diversity of the streaming media objects, thereby providing diversified solutions for the transmission of the streaming media objects through the network. In this way, in a case that a data receiver parses the streaming media transmission signaling to obtain the ranking relationship descriptor of each streaming media object, combines the at least two streaming media objects with the same ranking identifier field into a ranking relationship set, and ranks the at least two streaming media objects in the ranking relationship set according to the ranking information field to obtain the streaming media object sequence, the data receiver selects a to-be-received target streaming media object from the streaming media object sequence based on the device performance and network status, and transmits a streaming media transmission request for the target streaming media object to obtain the target streaming media object, which may ensure the transmission stability and reliability of streaming media data, and improve the transmission efficiency of the streaming media data.

In some embodiments of the disclosure, the ranking relationship descriptor further includes a combination determination field used for representing whether to perform combination and ranking on the streaming media objects; and the ranking of the at least two streaming media objects in the ranking relationship set according to the ranking information field to obtain the streaming media object sequence includes: obtaining a combination determination result based on a combination determination field of each of the at least two streaming media objects in the ranking relationship set, and ranking the at least two streaming media objects in the ranking relationship set based on the combination determination result and the ranking information field to obtain the streaming media object sequence.

In some embodiments of the disclosure, the combination determination field may be used for determining whether combination and ranking need to be performed on the streaming media objects. For each of the at least two streaming media objects, in a case that a value of the combination determination field of the streaming media object is a preset target field value, it indicates that the streaming media object needs to be combined with at least one another streaming media object in the ranking relationship set to form combination objects for ranking binding. The combination object is ranked as a whole. In a case that the combination determination field value of the streaming media object is not the target field value, it indicates that the streaming media object does not need to be ranked in combination with other streaming media objects in the ranking relationship set, but rather is ranked separately. The target field value may be configured according to an actual application scenario. For example, the target field value may be 1.

In this embodiment, it may be determined based on the combination determination field whether combination and ranking need to be performed on the streaming media objects, to obtain the combination determination result. Then, the at least two streaming media objects in the ranking relationship set may be accurately ranked according to the combination determination result and the ranking information field, to obtain the streaming media object sequence.

In some embodiments of the disclosure, in a case that the value of the combination determination field of any streaming media object in the ranking relationship set is the target field value, it indicates that combination and ranking need to be performed, and the data receiver will obtain the combination determination result indicating that combination and ranking need to be performed. In a case that the value of the combination determination field of neither of the at least two streaming media objects in the ranking relationship set is the target field value, it indicates that combination and ranking do not need to be performed, and the data receiver will obtain the combination determination result indicating that combination and ranking do not need to be performed.

In some embodiments of the disclosure, in a case that the value of the combination determination field of the streaming media object is not the target field value, a corresponding combination identifier field may be omitted, that is, the combination identifier field is not displayed in the ranking relationship descriptor. In a case that the value of the combination determination field of the streaming media object is the target field value, the corresponding combination identifier field needs to be displayed in the ranking relationship descriptor.

In some embodiments of the disclosure, the data receiver combines the at least two streaming media objects based on a combination identifier field of each of the at least two streaming media objects to obtain a combination result in a case that the combination determination result indicates that combination determination needs to be performed, and then ranks the at least two streaming media objects based on the combination result and the ranking information field to obtain the streaming media object sequence.

In some embodiments of the disclosure, the combination of the at least two streaming media objects based on the combination identifier field of each of the at least two streaming media objects to obtain the combination result includes: combining streaming media objects with the same combination identifier field into a combination object to obtain the combination result, the combination result including at least one combination object.

In some embodiments of the disclosure, for a plurality of streaming media objects with the values of the combination determination fields being the target field value, the data receiver may combine and match the plurality of streaming media objects based on the combination identifier field of each of the plurality of streaming media objects. The streaming media objects with the same combination identifier field may form combination objects in a ranking binding relationship. For example, if combination identifier fields of a streaming media object E and a streaming media object F both have a value of 100, and combination identifier fields of a streaming media object G and a streaming media object H both have a value of 101, the streaming media object E and the streaming media object F may form combination objects in the ranking binding relationship, and the streaming media object G and the streaming media object G may form another combination objects in the ranking binding relationship.

In this embodiment, the at least two streaming media objects may be combined based on the combination identifier field to obtain the combination result, and then the at least two streaming media objects may be accurately ranked through the combination result and the ranking information field to obtain the streaming media object sequence.

In some embodiments of the disclosure, the ranking of the at least two streaming media objects based on the combination result and the ranking information field to obtain the streaming media object sequence includes:

ranking the at least one combination object based on the ranking information field of each of the at least one combination object to obtain a first object sequence in a case that the at least two streaming media objects are both combined, and using the first object sequence as the streaming media object sequence; and ranking the at least one combination object and at least one uncombined streaming media object in the at least two streaming media objects based on the ranking information field to obtain a second object sequence in a case that the at least one uncombined streaming media object exists, and using the second object sequence as the streaming media object sequence.

In some embodiments of the disclosure, in a case that the at least two streaming media objects are both combined, it indicates that all elements in the ranking relationship set are combination objects composed of the streaming media objects, and the data receiver ranks the at least one combination object based on a value of the ranking information field of each of the at least one combination object to obtain the first object sequence arranged in order, and uses the first object sequence as the streaming media object sequence. In a case that the at least one uncombined streaming media object exists the at least two streaming media objects, it indicates that the elements in the ranking relationship set include both independent uncombined streaming media objects and combination objects composed of the streaming media objects, and the data receiver ranks the at least one combination object and the at least one uncombined streaming media object based on a value of the ranking information field of each of the at least one combination object and the at least one uncombined streaming media object to obtain the second object sequence arranged in order, and uses the second object sequence as the streaming media object sequence.

In some embodiments of the disclosure, in the case of ranking based on the value of the ranking information field, the ranking may be performed in ascending order of the value of the ranking information field, or may be performed in descending order of the value of the ranking information field.

In some embodiments of the disclosure, the ranking information field may include one piece of specified information of the quality ranking information, the priority ranking information, or the undefined ranking information, or may include two or more pieces of specified information. The data receiver may rank the at least combination object according to the same type of specified information, or may comprehensively the at least combination object according to a plurality of types of specified information. The data receiver may rank the at least one combination object and the at least one uncombined streaming media object according to the same type of specified information, or may comprehensively rank the at least one combination object and the at least one uncombined streaming media object according to a plurality of types of specified information.

In some embodiments of the present application, the value of the ranking information field of the combination object is determined according to the values of the ranking information fields of the streaming media objects constituting the combination object. In this embodiment, the way of determining the value of the ranking information field of the combination object based on the values of the ranking information fields of the streaming media objects constituting the combination object, as long as the determination may be achieved. For example, the value of the ranking information field of any streaming media object constituting the combination object may be directly used as the value of the ranking information field of the combination object. For another example, a smallest one of the values of the ranking information fields of the streaming media objects constituting the combination object may be used as the value of the ranking information field in the combination object. For another example, the streaming media objects constituting the combination object may share the same ranking information field, and the same ranking information field is the ranking information field of the combination object.

In this embodiment, for different combinations of the streaming media objects, the at least two streaming media objects are ranked in different ways, which may achieve accurate ranking of the at least two streaming media objects and obtain the streaming media object sequence.

In some embodiments of the disclosure, in a case that the combination determination result indicates that combination determination does not need to be performed, the data receiver ranks the at least two streaming media objects based on the ranking information field of each of the at least two streaming media objects to obtain the streaming media object sequence.

In some embodiments of the disclosure, in a case that the combination determination result indicates that combination determination does not need to be performed, it means that the at least two streaming media objects in the ranking relationship set are independent of each other and are ranked separately, and the data receiver directly ranks the at least two streaming media objects based on the value of the ranking information field of each of the at least two streaming media objects to obtain the streaming media object sequence.

In some embodiments of the disclosure, in the case of ranking based on the value of the ranking information field, the ranking may be performed in ascending order of the value of the ranking information field, or may be performed in descending order of the value of the ranking information field.

In some embodiments of the disclosure, the ranking information field may include one piece of specified information of the quality ranking information, the priority ranking information, or the undefined ranking information, or may include two or more pieces of specified information. The data receiver may rank the at least two streaming media objects according to the same type of specified information, or may comprehensively the at least two streaming media objects according to a plurality of types of specified information.

For example, in a case that the combination determination result indicates that combination determination does not need to be performed, it is assumed that the ranking relationship set includes a streaming media object A, a streaming media object B, and a streaming media object C, and the ranking field information of the streaming media object A has a value of 1, the ranking field information of the streaming media object B has a value of 2, and the ranking field information of the streaming media object C has a value of 3, and the at least two streaming media objects in the ranking relationship set are to be ranked in descending order of the value of the ranking information field. In this case, the streaming media object sequence obtained by the data receiver is streaming media object C-streaming media object B-streaming media object A. In this embodiment, in a case that the combination determination result indicates that the combination determination does not need to be performed, the at least two streaming media objects are directly ranked based on the ranking information field of each of the at least two streaming media objects, which may achieve fast and accurate ranking and obtain the streaming media object sequence.

In some embodiments of the disclosure, the ranking relationship descriptor further includes a range number field. The range number field is used for representing a number of ranking ranges to which a streaming media object belongs. For example, in SMT signaling, the range number field may be defined as an element ranking_set_num, which represents a number of ranking ranges to which a streaming media object belongs. Defining the range number field in the ranking relationship descriptor helps the decoder side traverse the ranking ranges to which the streaming media object belongs, thereby avoiding ranking errors and omissions, and avoiding full detection. Therefore, the ranking reliability and efficiency of the streaming media object may be further improved.

In some embodiments of the disclosure, the streaming media object includes at least one of a bitstream file Representation, an adaptive subset Adaptation Set, or a preselection set Preselection. The bitstream file Representation is a file object that includes at least one streaming media resource, the adaptive subset Adaptation Set is a file object that includes at least one bitstream file Representation, and the preselection set Preselection is a file object obtained by combining the bitstream file Representation or the adaptive subset Adaptation Set according to a preset rule. This embodiment of the disclosure is applicable to the transmission of streaming media objects in different dimensions, and has strong universal applicability, and may adapt to different versions of hardware devices, and is applicable to different types of streaming media transfer protocols.

In some embodiments of the disclosure, the streaming media resource is a point cloud media resource, and the streaming media object includes a geometry component and an attribute component, the geometry component being an adaptive subset used for representing geometry of point cloud constituents, and the attribute component being an adaptive subset used for representing attribute constituents of point cloud.

Point cloud is a set of randomly distributed discrete points in space that express the spatial structure and surface attributes of a three-dimensional object or scenario. Each point in the point cloud has at least three-dimensional position information, and may further have information about a color or a material depending on an application scenario. Usually, the points in the point cloud have the same number of additional attributes. Point cloud media may be classified into video based point cloud compression (VPCC) and geometry based point cloud compression (GPCC). In file encapsulation of point cloud media, three-dimensional position information is usually referred to as a geometry component of a point cloud file, and attribute information is referred to as an attribute component of the point cloud file. One point cloud file has only one geometry component, but may have one or more attribute components.

After a point cloud media resource is coded, the coded data stream needs to be encapsulated and transmitted to users. Correspondingly, on a point cloud media player side, the point cloud file needs to be first decapsulated, and then decoded, and finally the decoded data stream is presented.

In some embodiments of the disclosure, the streaming media resource may be an immersive media resource, such as a multi-perspective video or video coding point cloud. Correspondingly, the streaming media object may include volumetric media with different degrees of freedom, such as immersive media including a volumetric video type track with degrees of freedom such as 3DoF, 3DoF+, or 6DoF.

In this embodiment, by providing the plurality of components, diversified solutions may be provided for the transmission of the streaming media objects through the network, the transmission stability and reliability of the streaming media data may be ensured, and the transmission efficiency of the streaming media data may be improved.

Figure 5:
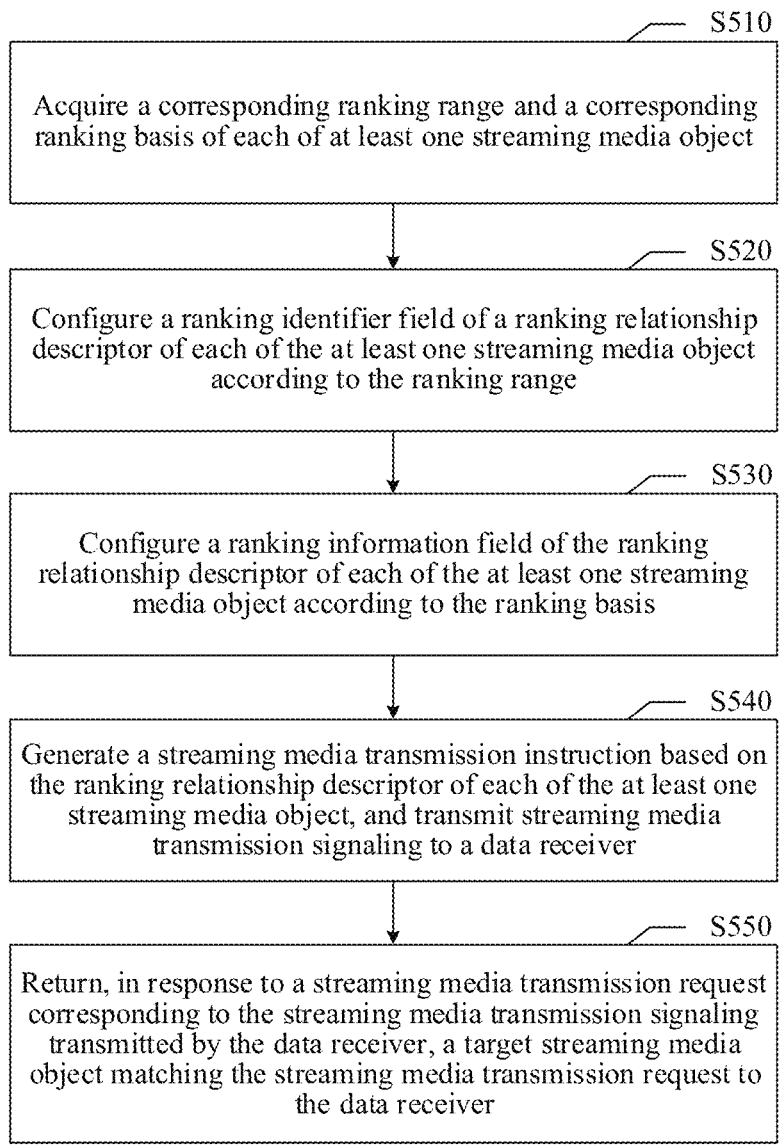
FIG. 5 is a flowchart of operations of a streaming media transmission method executed by a coder side, according to some embodiments.

FIG. 5 is a flowchart of operations of a streaming media transmission method executed by a coder side according to some embodiments of the disclosure. The coder side may be understood as a data sender transmitting streaming media data, and the method may be applied to a server or to an intermediate node for data communication between a server and a terminal device. As shown in FIG. 5, the streaming media transmission method may include the following operation S510 to operation S550.

Operation S510: Acquire a corresponding ranking range and a corresponding ranking basis of each of at least one streaming media object.

In some embodiments of the disclosure, the at least one streaming media object is classified to obtain the corresponding ranking range of each of the at least one streaming media object, and streaming media objects belonging to the same ranking range are ranked to obtain the corresponding ranking basis of each of the at least one streaming media object.

A ranking relationship between among the streaming media objects includes two levels: a ranking range and a ranking position. The streaming media objects belonging to the same ranking range may be ranked according to the ranking basis, while streaming media objects belonging to different ranking ranges cannot be ranked with respect to each other. The data sender acquires a corresponding quality evaluation result of each of the at least one streaming media object, and classifies the at least one streaming media object based on the quality evaluation result and a preconfigured classification rule, to obtain the corresponding ranking range of each of the at least one streaming media object.

The quality evaluation result is a result obtained by performing quality evaluation on the streaming media object, and quality of the streaming media object may be determined based on the quality evaluation result. The preconfigured classification rule may be configured according to an actual application scenario. For example, the preconfigured classification rule may be used for classifying high-quality streaming media objects into a category and low-quality streaming media objects into another category. The so-called high quality and low quality are relative concepts. In some embodiments, the quality of the streaming media object may be determined based on the quality evaluation result and a preconfigured quality evaluation threshold. The quality evaluation result may be specifically a quality evaluation score. When the quality evaluation score is greater than the quality evaluation threshold, the quality of the streaming media object is high quality. When the quality evaluation score is less than or equal to the quality evaluation threshold, the quality of the streaming media object is low quality. In some embodiments of the disclosure, one streaming media object may belong to at least one ranking range.

In some embodiments of the disclosure, the corresponding ranking basis of each of the at least one streaming media object may be acquired based on a preconfigured ranking rule after the corresponding ranking range of each of the at least one streaming media object is acquired. The preconfigured ranking rule may be configured according to an actual application scenario, and defines the way to rank the streaming media objects in the ranking range. A plurality of streaming media objects belonging to the same ranking range may have a single type of ranking basis, or may have a plurality of types of ranking bases.

In this embodiment, the streaming media objects are classified into a plurality of different ranking ranges, and the streaming media objects are ranked according to different ranking bases within the specific ranking range, the ranking flexibility and diversity of the streaming media object may be improved, thereby providing diversified solutions for the transmission of the streaming media objects through the network, ensuring the transmission stability and reliability of the streaming media data, and improving the transmission efficiency of the streaming media data.

Operation S520: Configure a ranking identifier field of a ranking relationship descriptor of each of the at least one streaming media object according to the ranking range.

In some embodiments of the disclosure, when two streaming media objects belong to the same ranking range, the two streaming media objects may be configured with ranking identifier fields with the same value. When the two streaming media objects belong to two different ranking ranges, the two streaming media objects may be configured with ranking identifier fields with different values. When a streaming media object belongs to two or more ranking ranges, ranking identifier field values respectively corresponding to the ranking ranges may be configured for the streaming media object. For example, the streaming media object A and the streaming media object B belong to a same ranking range, and the streaming media object C and the streaming media object D belong to another same ranking range. In this case, the ranking identifier fields of both the streaming media object A and the streaming media object B may be configured as 1, and the ranking identifier fields of both the streaming media object C and the streaming media object D may be configured as 2. For another example, the streaming media object A belongs to both a first ranking range and a second ranking range. In this case, a first ranking identifier field corresponding to the first ranking range may be configured for the streaming media object A, and a second ranking identifier field corresponding to the second ranking range may be configured for the streaming media object A.

Operation S530: Configure a ranking information field of the ranking relationship descriptor of each of the at least one streaming media object according to the ranking basis.

In an embodiment of the disclosure, after acquiring the ranking basis, the data sender may configure the ranking information field of the ranking relationship descriptor of each of the at least one streaming media object according to the ranking basis.

In some embodiments of the disclosure, before streaming media transmission signaling is transmitted to a data receiver, a range number of corresponding ranking ranges of each of the at least one streaming media object may be counted, and then a range number field of the ranking relationship descriptor may be configured according to the range number. The range number field is used for representing a number of ranking ranges to which a streaming media object belongs. For example, in SMT signaling, the range number field may be defined as an element ranking_set_num, which represents a number of ranking ranges to which a streaming media object belongs. Defining the range number field in the ranking relationship descriptor helps the decoder side traverse the ranking ranges to which the streaming media object belongs, thereby avoiding ranking errors and omissions, and avoiding full detection. Therefore, the ranking reliability and efficiency of the streaming media object may be further improved.

In some embodiments of the disclosure, before the transmission of the streaming media transmission signaling to the data receiver, the method further includes:

acquiring a corresponding component type of each of the at least one streaming media object, and performing ranking binding determination on the at least one streaming media object based on the component type, to obtain a ranking binding determination result; and configuring a combination identifier field of a ranking relationship descriptor of each to-be-bound streaming media object in a ranking binding relationship according to the ranking binding relationship in a case that the ranking binding determination result indicates that the to-be-bound streaming media object exists, and configuring a combination determination field of the ranking relationship descriptor of the to-be-bound streaming media object according to a target field value.

In some embodiments of the disclosure, the component type is used for representing a type of the streaming media object. For example, the component type may be specifically a geometry type, and the streaming media object is a geometry component. For another example, the component type may be an attribute type, and the streaming media object is an attribute component. Based on the component type, it may be determined which of the at least one streaming media object may be bound. After the streaming media objects that may be bound are determined, the to-be-bound streaming media objects in the ranking binding relationship may be determined from the streaming media objects that may be bound based on a preconfigured binding rule, to obtain the ranking binding determination result.

In some embodiments of the disclosure, only streaming media objects belonging to different component types may be bound, that is, only streaming media objects of different types may be bound. For example, the geometry component may be bound to the attribute component, but the geometry components cannot be bound to each other, and the attribute components cannot be bound to each other. The preconfigured binding rule may be configured according to an actual application scenario. The preconfigured binding rule is used for determining quality of the to-be-bound streaming media objects. For example, the preconfigured binding rule may be specifically binding streaming media objects of the same quality with different component types. For example, a high-quality geometry component and a high-quality attribute component may be bound, and a low-quality geometry component and a low-quality attribute component may be bound. For example, the preconfigured binding rule may be specifically binding streaming media objects of different quality with different component types. For example, a high-quality geometry component and a low-quality attribute component may be bound, or a low-quality geometry component and a high-quality attribute component may be bound.

In some embodiments of the disclosure, for the to-be-bound streaming media objects in the ranking binding relationship, the same field value may be assigned to the combination identifier fields of the to-be-bound streaming media objects, and the combination determination fields of the ranking relationship descriptors of the to-be-bound streaming media objects may be configured according to the target field value. Configuring the combination identifier field and the combination determination field helps the decoder side efficiently determine whether the streaming media objects may be combined. If the streaming media objects in the ranking binding relationship may be combined into a combination object, the combination object may be ranked as a whole during the object ranking, thereby reducing the computation amount of the object ranking and improving the efficiency of the object ranking. During data transmission for the target streaming media object, the combination object may be transmitted as a whole, thereby further improving the transmission efficiency of the streaming media data.

Operation S540: Generate a streaming media transmission instruction based on the ranking relationship descriptor of each of the at least one streaming media object, and transmit streaming media transmission signaling to a data receiver.

Operation S550: Return, in response to a streaming media transmission request corresponding to the streaming media transmission signaling and transmitted by the data receiver, a target streaming media object matching the streaming media transmission request to the data receiver.

In some embodiments of the disclosure, the data receiver may select, from the streaming media object sequence, an object satisfying a data demand as the to-be-received target streaming media object. The to-be-received target streaming media object may be a single streaming media object or all streaming media objects in a combination object. For example, when the device performance of the data receiver and the network status are desirable, a streaming media object ranked high in terms of quality or priority may be preferentially selected as the to-be-received target streaming media object. When the device performance of the data receiver or the network status is poor, a streaming media object ranked low in terms of quality or priority may be selected as the to-be-received target streaming media object.

After the to-be-received target streaming media object is selected, the data receiver may transmit a streaming media transmission request for the target streaming media object to the data sender. After receiving the streaming media transmission request, the data sender may transmit the target streaming media object matching the streaming media transmission request to the data receiver according to the demand of the data receiver.

According to the streaming media transmission method provided in this embodiment of the disclosure, the streaming media objects are grouped into a plurality of different ranking ranges, and the streaming media objects are ranked according to different ranking bases within a specific ranking range, which may improve the ranking flexibility and diversity of the streaming media objects, thereby providing diversified solutions for the transmission of the streaming media objects through the network. In this way, in a case that a data receiver may parse the streaming media transmission signaling to obtain the streaming media object sequence on the basis of generating a streaming media transmission instruction based on the ranking relationship descriptor of each of the at least one streaming media object and transmitting the streaming media transmission instruction to the data receiver, the data receiver selects a to-be-received target streaming media object from the streaming media object sequence based on the device performance and network status, and transmits a streaming media transmission request for the target streaming media object to obtain the target streaming media object, which may ensure the transmission stability and reliability of streaming media data, and improve the transmission efficiency of the streaming media data.

In an application scenario of this embodiment of the disclosure, the server organizes a media file in the form of a video stream and generates a corresponding signaling file based on a structure of the media file and quality information and priority information that are included. Quality information and priority information of the video stream within a specific range are indicated based on the quality information and the priority information in the file. The server transmits the signaling file to a client. The client requests for an appropriate video stream and decodes and consumes the video stream according to a demand, a network condition, or a decoding capability with reference to the quality information and the priority information in the signaling file.

In this embodiment of the disclosure, a plurality of descriptive fields may be added to a system layer, including a field extension at a signaling message level, to support the implementation operations in this embodiment of the disclosure. In the following, an example in the form of extending existing DASH signaling is used to define the indication method for related ranking information such as the quality and priority of video streaming.

In some embodiments of the disclosure, an element SupplementalProperty with an @ schemeIdUri attribute value of "urn:avs:ims:2020:rk-relation" is used to represent a ranking relationship descriptor. The descriptor is configured to define quality ranking information or priority ranking information between specific Representations and between specific Adaptation Sets. The descriptor may describe media resources at levels of Representation, Adaptation Set, or Preselection. One or more ranking relationship descriptors may exist in MPD signaling. Syntax and semantics of the descriptor are shown in the following Table 1.

TABLE 1

The syntax and semantics of the ranking relationship descriptor

| Elements and attributes of the ranking relationship descriptor | Usage | Description |
| --- | --- | --- |
| RankingRelationship | 0 . . . N | Used for specifying quality ranking information or priority ranking information within a specific range |
| RankingRelationship@id | Mandatory | Representations, Adaptation Sets, or Preselections including the same id constitute the quality ranking range, priority ranking range, or undefined ranking range. Representations, Adaptation Sets, or Preselections including different ids may not be compared based on the corresponding qualityRankings, priorityRankings, or undefinedRankingIds. |
| RankingRelationship@combineRankingFlag | Optional | The value of the field being 1 indicates that all resource sets carrying the same RankingRelationship @combineRankingId join quality ranking, priority ranking, or undefined ranking as a whole. |
| RankingRelationship@combineRankingId | Mandatory-if-applicable | When the value of RankingRelationship@combineRankingFlag is 1, the field is a mandatory field. All resource sets carrying the same RankingRelationship @combineRankingId join quality ranking, priority ranking, or undefined ranking as a whole. |
| RankingRelationship@qualityRanking | Optional | Specifying the quality ranking information of the corresponding resource or resource set. A smaller value of the field indicates a higher quality level. If a plurality of resources are ranked as a whole, the field can appear only once. |
| RankingRelationship@priorityRanking | Optional | Specifying the priority ranking information of the corresponding resource or resource set. A smaller value of the field indicates a higher priority. If a plurality of resources are ranked as a whole, the field can appear only once. |
| RankingRelationship@undefinedRanking | Optional | When different resources or resource sets are classified according to the special rule (such as an algorithm type) and cannot be conventionally ranged according to the quality |

TABLE 1-continued

The syntax and semantics of the ranking relationship descriptor

| Elements and attributes of the ranking relationship descriptor | Usage | Description |
|---|---|---|
| | | levels or priorities, the field specifies the classification way under the special rule. Resources or resource sets with the same value in the field are resources or resource sets of the same level under the classification way. If a plurality of resources are ranked as a whole, the field can appear only once. |

In some embodiments of the disclosure, the field RankingRelationship@qualityRanking may be replaced with the field @qualityRanking. The field RankingRelationship@priorityRanking in the above descriptor may be replaced with the field @ selectionPriority.

In some embodiments of the disclosure, field extension may be performed on the ranking relationship descriptor based on the existing field of the streaming media transmission signaling, to realize flexible quality ranking and priority ranking of media resources such as Representation, Adaptation Set, and Preselection within a specific range. For example, in the following, Table 2 shows the syntax and semantics of extension of a quality ranking equivalent descriptor in some embodiments of the disclosure, Table 3 shows the syntax and semantics of extension of a priority selection information descriptor in some embodiments of the disclosure, and Table 4 shows the syntax and semantics of extension of the alternative information descriptor in some embodiments of the disclosure.

TABLE 2

The syntax and semantics of extension of the quality ranking equivalent descriptor

| Elements and attributes of the quality ranking equivalent descriptor | Usage | Description |
|---|---|---|
| qr-equivalence | 0 . . . N | Used for specifying quality ranking information within a specific range |
| qr-equivalence @id | Mandatory | Representations, Adaptation Sets, or Preselections including the same id constitute the quality ranking range. Representations, Adaptation Sets, or Preselections including different ids may not be compared based on the corresponding field priorityRankings. |
| qr-equivalence @combineRankingFlag | Optional | The value of the field being 1 indicates that all resource sets carrying the same qr-equivalence@combineRankingFlag join quality ranking as a whole. |
| qr-equivalence @combineRankingId | Mandatory-if-applicable | When the value of qr-equivalence@combineRankingFlag is 1, the field is a mandatory field. All resource sets carrying the same qr-equivalence @combineRankingId join quality ranking as a whole. |

TABLE 3

The syntax and semantics of extension of the priority selection information descriptor

| Elements and attributes of the priority selection information descriptor | Usage | Description |
|---|---|---|
| SelectionPriorityInfo | 0 . . . N | Used for specifying priority ranking information within a specific range |
| SelectionPriorityInfo@id | Mandatory | Representations, Adaptation Sets, or Preselections including the same id constitute the priority ranking range. Representations, Adaptation Sets, or Preselections including different ids may not be compared based on the corresponding selectionPriorities. |
| SelectionPriorityInfo @combineRankingFlag | Optional | The value of the field being 1 indicates that all resource sets carrying the same SelectionPriorityInfo @combineRankingId join priority ranking as a whole. |
| SelectionPriorityInfo@ combineRankingId | Mandatory-if-applicable | When the value of SelectionPriorityInfo@combineRankingFlag is 1, the field is a mandatory field. All resource sets carrying the same SelectionPriorityInfo @combineRankingId join priority ranking as a whole. |

TABLE 4

The syntax and semantics of the alternative information descriptor

| Elements and attributes of the alternative information descriptor | Usage | Description |
|---|---|---|
| AlternativeInfo | 0 . . . N | Used for specifying a classification difference between alternative resources or resource sets under a special rule |
| AlternativeInfo@id | Mandatory | Representations, Adaptation Sets, or Preselections with the same id constitute an alternative group. |
| AlternativeInfo@combineRankingFlag | Optional | The value of the field being 1 indicates that all resource sets carrying the same AlternativeInfo @combineRankingId are used as a selection within the alternative group as a whole. |
| AlternativeInfo@combineRankingId | Mandatory-if-applicable | When the value of AlternativeInfo@combineRankingFlag is 1, the field is a mandatory field. All resource sets carrying the same AlternativeInfo@combineRankingId are used as a selection within the alternative group as a whole. |
| AlternativeInfo@undefinedRankingId | Optional | When different resources or resource sets are classified according to the special rule (such as an algorithm type) and cannot be conventionally ranged according to the quality levels or priorities, the field specifies the classification way under the special rule. Resources or resource sets with the same value in the field are resources or resource sets of the same level under the classification way. If a plurality of resources are ranked as a whole, the field can appear only once. |

Signaling extension of a ranking association descriptor in this embodiment of the disclosure is described below by using SMT signaling extension as an example. In SMT signaling, the ranking association descriptor may be defined as a ranking set descriptor Ranking_set_descriptor. The ranking set descriptor Ranking_set_descriptor is used for indicating information about a ranking set to which a current media resource belongs. One media resource may belong to one or more ranking sets. Table 5 shows the syntax information of the ranking set descriptor Ranking_set_descriptor.

TABLE 5

The syntax information of the ranking set descriptor

| Syntax | Value | Bit number | Note |
|---|---|---|---|
| Ranking_set_descriptor( ) { | | | |
|   descriptor_tag | | 16 | uimsbf |
|   descriptor_length | | 32 | uimsbf |
|   ranking_set_num | N1 | 8 | uimsbf |
|   for (i=0; i<N1; i++) { | | | |
|     ranking_set_id | | 8 | uimsbf |
|     combine_ranking_flag | | 1 | bool |
|     reserved | | 7 | uimsbf |
|     if(combine_ranking_flag == 1){ | | | |
| combine_ranking_id | | 8 | uimsbf |
|     } | | | |
|     quality_ranking | | 8 | uimsbf |
|     priority_ranking | | 8 | uimsbf |
|     undefined_ranking | | 8 | uimsbf |
|   } | | | |
| } | | | |

Definitions of the elements are as follows.

descriptor_tag: An identifier used for representing a descriptor type.

descriptor_length: An identifier length in a unit of byte.

ranking_set_num: Indicating a number of ranking sets to which a current media resource belongs.

ranking_set_id: A ranking set identifier. Media resources including the same ranking_set_id constitute the quality ranking range, priority ranking range, and undefined ranking range. Media resources including different ranking_set_id cannot be compared based on the corresponding quality_ranking, priority_ranking, or undefined_ranking.

combine_ranking_flag: The value of the field being 1 indicates that all resource sets carrying the same combine_ranking_id join quality ranking, priority ranking, or undefined ranking as a whole.

combine_ranking_id: All resource sets carrying the same combine_ranking_id join quality ranking, priority ranking, or undefined ranking as a whole.

quality_ranking: Specifying the quality ranking information of the corresponding resource or resource set. A smaller value of the field indicates a higher quality level.

priority_ranking: Specifying the priority ranking information of the corresponding resource or resource set. A smaller value of the field indicates a higher priority.

undefined_ranking: When different resources or resource sets are classified according to the special rule (such as an algorithm type) and cannot be conventionally ranged according to the quality levels or priorities, the field specifies the classification way under the special rule. Resources or resource sets with the same value in the field are resources or resource sets of the same level under the classification way.

A process of streaming media transmission of, for example, a point cloud media resource in an application scenario is described below.

First, the server organizes a media file in the form of a video stream and generates a corresponding signaling file based on a structure of the media file and quality information that is included. Quality information of the video stream within a specific range are indicated based on the quality information in the file. It is assumed that a point cloud file F1 includes a geometry component, an attribute components-color. The geometry component and the attribute component each have two different quality versions, and a combination of the different quality versions constitutes the overall quality information of point cloud consumption. DASH signaling generated based on the above is follows:

[Adaptation Set1 (geometry component):
{ Representation1:
{ RankingRelationship@id = 1;
RankingRelationship@combineRankingFlag = 1;
RankingRelationship@combineRankingId = 100;
RankingRelationship@qualityRanking = 0}
{ RankingRelationship@id = 1;
RankingRelationship@combineRankingFlag = 1;
RankingRelationship@combineRankingId = 101;

```
            RankingRelationship@qualityRanking = 1}
        }
        { Representation2:
        { RankingRelationship@id = 1;
        RankingRelationship@combineRankingFlag = 1;
        RankingRelationship@combineRankingId = 102;
        RankingRelationship@qualityRanking = 2}
        { RankingRelationship@id = 1;
        RankingRelationship@combineRankingFlag = 1;
        RankingRelationship@combineRankingId = 103;
        RankingRelationship@qualityRanking = 3}
        }]
        [Adaptation Set2 (attribute component-color):
        { Representation3: { RankingRelationship@id = 1;
        RankingRelationship@combineRankingFlag = 1;
        RankingRelationship@combineRankingId = 100}
        { RankingRelationship@id = 1;
        RankingRelationship@combineRankingFlag = 1;
        RankingRelationship@combineRankingId = 101}}
        { Representation4:
        { RankingRelationship@id = 1;
        RankingRelationship@combineRankingFlag = 1;
        RankingRelationship@combineRankingId = 102}
        { RankingRelationship@id = 1;
        RankingRelationship@combineRankingFlag = 1;
        RankingRelationship@combineRankingId = 103}
        }]
```

The server transmits the signaling file to the client.

Through the signaling message, the client may learn that for the point cloud file F1, the server includes two geometry components of different quality (Representation1 and Representation2) and two attribute components of different quality (Representation3 and Representation4). Two media stream combinations: Representation1+Representation3 and Representation2+Representation4 are formed for quality ranking.

Finally, the client requests for an appropriate video stream and decodes and consumes the video stream according to a demand, a network condition, or a decoding capability with reference to the quality information in the signaling file.

In order to satisfy the application requirements, this embodiment of the disclosure provides the quality and priority information indication method for video streaming media, especially for immersive media (point cloud, multi-perspective videos, panoramic videos, and the like). Through the method provided in this embodiment of the disclosure, quality and a priority of the video stream within a specific range may be flexibly defined and indicated, thereby enabling the client to request a corresponding video stream according to a demand.

Although the various operations of the method in the disclosure are described in specific order in the drawings, this does not require or imply that the operations need to be performed in the specific order, or all the operations shown need to be performed to achieve the expected result. Additionally or alternatively, some operations may be omitted, a plurality of operations may be combined into one operation for execution, and/or one operation may be divided into a plurality of operations for execution, or the like.

The following describes apparatus embodiments of the disclosure, which may be configured to perform the streaming media transmission method in the above embodiments of the disclosure.

Figure 6:
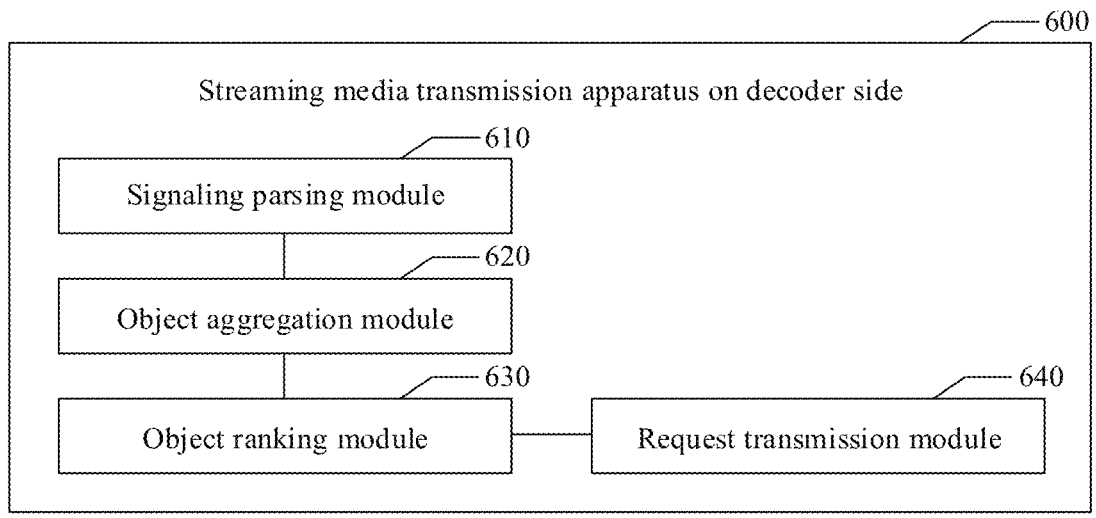
FIG. 6 is a structural block diagram of a streaming media transmission apparatus on the decoder side, according to some embodiments.

FIG. 6 is a structural block diagram of a streaming media transmission apparatus on the decoder side according to an embodiment of the disclosure. As shown in FIG. 6, a streaming media transmission apparatus 600 on a decoder side may mainly include:

a signaling parsing module 610, configured to parse streaming media transmission signaling to obtain a ranking relationship descriptor of each streaming media object, the ranking relationship descriptor including a ranking identifier field and a ranking information field, the ranking identifier field being used for representing a ranking range, and the ranking information field being used as a ranking basis;

an object aggregation module 620, configured to form a ranking relationship set with at least two streaming media objects having the same ranking identifier field;

an object ranking module 630, configured to rank the at least two streaming media objects in the ranking relationship set according to the ranking information field to obtain a streaming media object sequence; and a request transmission module 640, configured to select a to-be-received target streaming media object from the streaming media object sequence, and transmit a streaming media transmission request for the target streaming media object, the streaming media transmission request being used for requesting to acquire the target streaming media object.

According to the streaming media transmission apparatus provided in this embodiment of the disclosure, the streaming media objects are grouped into a plurality of different ranking ranges, and the streaming media objects are ranked according to different ranking bases within a specific ranking range, which may improve the ranking flexibility and diversity of the streaming media objects, thereby providing diversified solutions for the transmission of the streaming media objects through the network. In this way, in a case that a data receiver parses the streaming media transmission signaling to obtain the ranking relationship descriptor of each streaming media object, combines the at least two streaming media objects with the same ranking identifier field into a ranking relationship set, and ranks the at least two streaming media objects in the ranking relationship set according to the ranking information field to obtain the streaming media object sequence, the data receiver selects a to-be-received target streaming media object from the streaming media object sequence based on the device performance and network status, and transmits a streaming media transmission request for the target streaming media object to obtain the target streaming media object, which may ensure the transmission stability and reliability of streaming media data, and improve the transmission efficiency of the streaming media data.

In some embodiments of the disclosure, the object ranking module is further configured to obtain a combination determination result based on a combination determination field of each of the at least two streaming media objects in the ranking relationship set, and rank the at least two streaming media objects in the ranking relationship set based on the combination determination result and the ranking information field to obtain the streaming media object sequence.

In some embodiments of the disclosure, the ranking relationship descriptor further includes a combination identifier field used for representing a combination and ranking range; and the object ranking module is further configured to combine the at least two streaming media objects based on a combination identifier field of each of the at least two streaming media objects to obtain a combination result in a case that the combination determination result indicates that combination determination needs to be performed, and rank the at least two streaming media objects based on the combination result and the ranking information field to obtain the streaming media object sequence.

In some embodiments of the disclosure, the object ranking module is further configured to: combine streaming media objects with the same combination identifier field into a combination object to obtain the combination result, the combination result including at least one combination object; rank the at least one combination object based on the ranking information field of each of the at least one combination object to obtain a first object sequence in a case that the at least two streaming media objects are both combined, and use the first object sequence as the streaming media object sequence; and rank the at least one combination object and at least one uncombined streaming media object in the at least two streaming media objects based on the ranking information field to obtain a second object sequence in a case that the at least one uncombined streaming media object exists, and use the second object sequence as the streaming media object sequence.

In some embodiments of the disclosure, the object ranking module is further configured to rank the at least two streaming media objects based on the ranking information field of each of the at least two streaming media objects to obtain the streaming media object sequence in a case that the combination determination result indicates that combination determination does not need to be performed.

Figure 7:
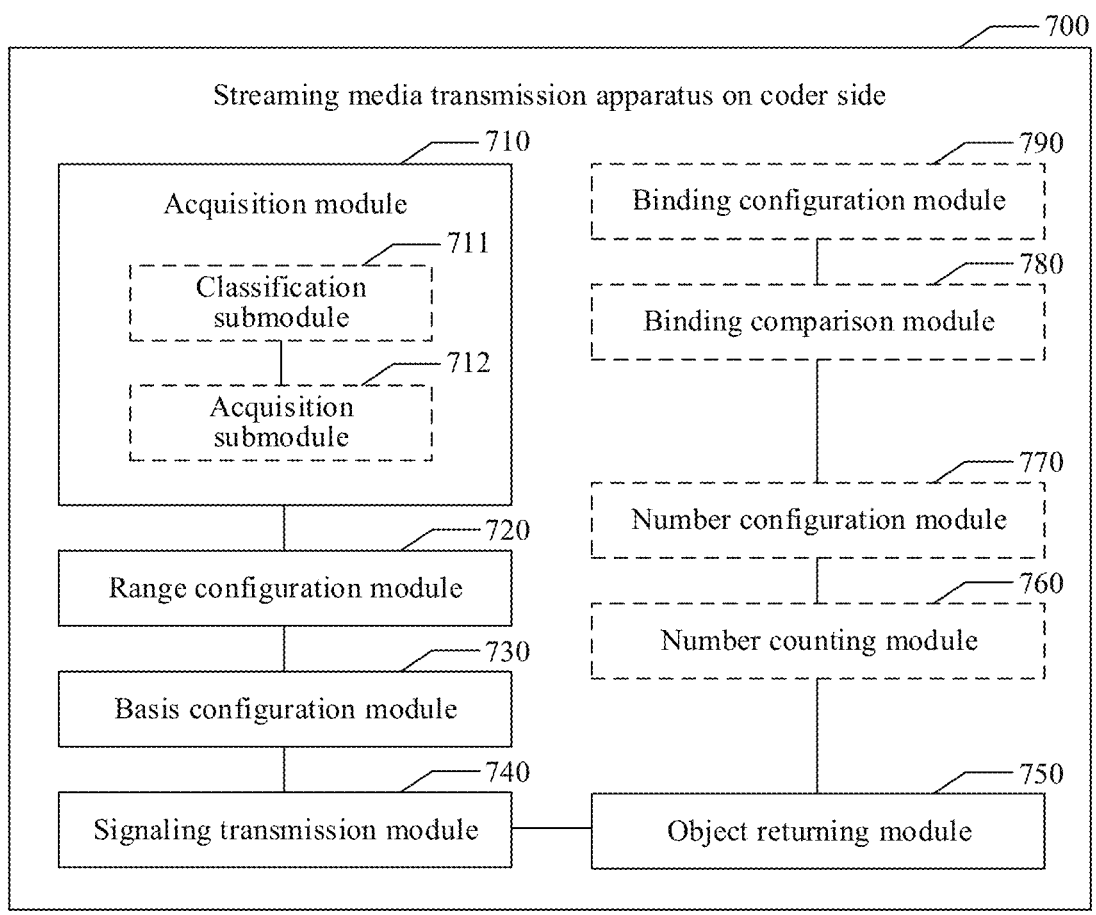
FIG. 7 is a structural block diagram of a streaming media transmission apparatus on the coder side, according to some embodiments.

FIG. 7 is a structural block diagram of a streaming media transmission apparatus on the coder side according to an embodiment of the disclosure. As shown in FIG. 7, a streaming media transmission apparatus 700 on a coder side may mainly include:
- an acquisition module 710, configured to acquire a corresponding ranking range and a corresponding ranking basis of each of at least one streaming media object;
- a range configuration module 720, configured to configure a ranking identifier field of a ranking relationship descriptor of each of the at least one streaming media object according to the ranking range;
- a basis configuration module 730, configured to configure a ranking information field of the ranking relationship descriptor of each of the at least one streaming media object according to the ranking basis;
- a signaling transmission module 740, configured to generate a streaming media transmission instruction based on the ranking relationship descriptor of each of the at least one streaming media object, and transmit streaming media transmission signaling to a data receiver; and
- an object returning module 750, configured to return, in response to a streaming media transmission request corresponding to the streaming media transmission signaling and transmitted by the data receiver, a target streaming media object matching the streaming media transmission request to the data receiver.

According to the streaming media transmission apparatus provided in this embodiment of the disclosure, the streaming media objects are grouped into a plurality of different ranking ranges, and the streaming media objects are ranked according to different ranking bases within a specific ranking range, which may improve the ranking flexibility and diversity of the streaming media objects, thereby providing diversified solutions for the transmission of the streaming media objects through the network. In this way, in a case that a data receiver may parse the streaming media transmission signaling to obtain the streaming media object sequence on the basis of generating a streaming media transmission instruction based on the ranking relationship descriptor of each of the at least one streaming media object and transmitting the streaming media transmission instruction to the data receiver, the data receiver selects a to-be-received target streaming media object from the streaming media object sequence based on the device performance and network status, and transmits a streaming media transmission request for the target streaming media object to obtain the target streaming media object, which may ensure the transmission stability and reliability of streaming media data, and improve the transmission efficiency of the streaming media data.

In some embodiments of the disclosure, the acquisition module 710 may include:
- a classification submodule 711, configured to classify the at least one streaming media object to obtain the corresponding ranking range of each of the at least one streaming media object;
- an acquisition submodule 712, configured to rank streaming media objects belonging to the same ranking range to obtain the corresponding ranking basis of each of the at least one streaming media object.

In some embodiments of the disclosure, the streaming media transmission apparatus 700 on the coder side further includes:
- a number counting module 760, configured to count a range number of ranking ranges corresponding to each of the at least one streaming media object; and
- a number configuration module 770, configured to configure a range number field of a ranking relationship descriptor of each of at least one streaming media object according to the range number.

In some embodiments of the disclosure, the streaming media transmission apparatus 700 on the coder side further includes:
- a binding comparison module 780, configured to acquire a corresponding component type of each of the at least one streaming media object, and perform ranking binding determination on the at least one streaming media object based on the component type, to obtain a ranking binding determination result; and
- a binding configuration module 790, configured to configure a combination identifier field of a ranking relationship descriptor of each to-be-bound streaming media object in a ranking binding relationship according to the ranking binding relationship in a case that the ranking binding determination result indicates that the to-be-bound streaming media object exists, and configure a combination determination field of the ranking relationship descriptor of the to-be-bound streaming media object according to a target field value.

The specific details of the streaming media transmission apparatuses provided in the embodiments of the disclosure have been described in detail in the corresponding method embodiments, and therefore are not repeated herein.

Figure 8:
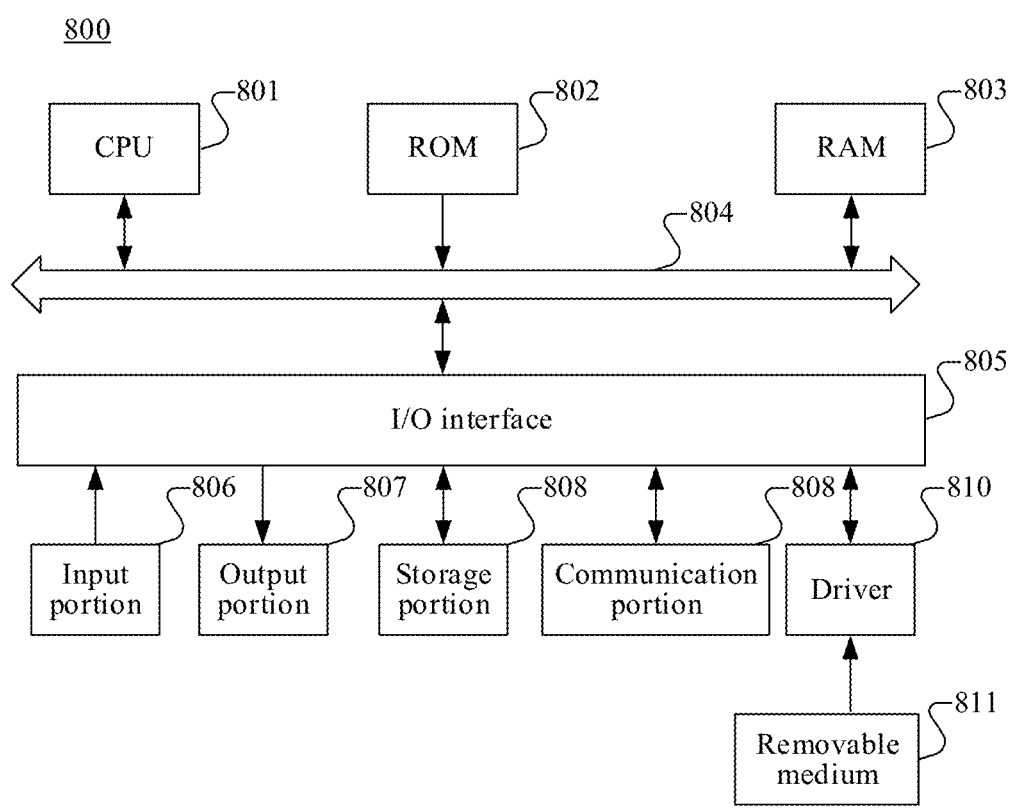
FIG. 8 is a structural block diagram of a computer system adapted to implement an electronic device according to some embodiments.

FIG. 8 is a structural block diagram of a computer system configured to implement an electronic device according to an embodiment of the disclosure. The electronic device includes one or more processors and a memory. The memory stores a computer program. When the processors execute the computer program, the operations in the above method embodiments are implemented.

The computer system 800 implementing the electronic device shown in FIG. 8 is merely an example, and does not impose any limitation on a function and use scope of the embodiments of the disclosure.

As shown in FIG. 8, the computer system 800 includes a central processing unit (CPU) 801. The CPU may perform various appropriate actions and processing according to a program stored in a read-only memory (ROM) 802 or a program loaded from a storage portion 808 into a random access memory (RAM) 803. The RAM 803 further stores various programs and data required for system operations. The CPU 801, the ROM 802, and the RAM 803 are connected to each other through a bus 804. An input/output (I/O) interface 805 is also connected to the bus 804.

The following components are connected to the I/O interface 805: an input portion 806 including a keyboard and a mouse; an output portion 807 including a cathode ray tube (CRT), a liquid crystal display (LCD), and a speaker; a storage portion 808 including a hard disk; and a communication portion 809 including a network interface card such as a local area network card and a modem. The communication portion 809 performs communication processing by using a network such as the Internet. A driver 810 is also connected to the I/O interface 805 as required. A removable medium 811, such as a magnetic disk, an optical disc, a magneto-optical disk, or a semiconductor memory is installed on the drive 810 as required, so that a computer program read from the removable medium is installed into the storage portion 808 as required.

Particularly, according to an embodiment of the disclosure, the processes described in each method flowchart may be implemented as computer software programs. For example, an embodiment of the disclosure includes a computer program product, the computer program product includes computer-readable instructions carried on a computer-readable storage medium, and the computer-readable instructions include program code for executing the streaming media transmission method. In such an embodiment, the computer-readable instructions may be downloaded and installed from a network through the communication portion 809, and/or installed from the removable medium 811. When the computer-readable instructions are executed by the CPU 801, the various functions defined in the system of the disclosure are executed.

In some embodiments, the disclosure further provides one or more computer storage media, the computer storage media store at least one computer-readable instruction, and the computer-readable instruction includes a program instruction. When the processor executes the program instruction, the streaming media transmission method in the above corresponding embodiment mentioned may be performed. The details are not described herein.

According to an aspect of the disclosure, a computer program product or a computer-readable instruction is provided. The computer program product or the computer-readable instruction includes computer-readable instruction code stored in a computer-readable storage medium. A processor of a computer device reads the computer-readable instruction code from the computer-readable storage medium, and the processor executes the computer-readable instruction code, so that the computer device may perform the streaming media transmission method in the above corresponding embodiment. The details are not described herein.

A person of ordinary skill in the art may understand that all or some of process of the method in the above embodiments may be implemented by using a computer program to instruct relevant hardware. The computer program may be stored in a non-volatile computer-readable storage medium. When the computer program is executed, the process of the above method embodiments may be included. Any reference to the memory, the database, or other media used in the embodiments provided in the disclosure may include at least one of a non-volatile memory and a volatile memory. The non-volatile memory may include a ROM, a magnetic tape, a floppy disk, a flash memory, an optical memory, a high-density embedded non-volatile memory, a resistance random access memory (ReRAM), a magnetoresistive random access memory (MRAM), a ferroelectric random access memory (FRAM), a phase change memory (PCM), a graphene memory, and the like. The volatile memory may include a RAM, an external cache memory, and the like. By way of description and not limitation, the RAM may be in various forms, such as a static random access memory (SRAM), a dynamic random access memory (DRAM), or the like. The technical features in the above embodiments may be randomly combined. For concise description, not all possible combinations of the technical features in the embodiments are described. However, provided that combinations of the technical features do not conflict with each other, the combinations of the technical features are considered as falling within the scope described in the description.

The above embodiments merely express several implementations of the disclosure. The descriptions thereof are relatively specific and detailed, but are not to be understood as limitations to the scope of the disclosure. A person of ordinary skill in the art may make several transformations and improvements without departing from the idea of the disclosure. The transformations and improvements belong to the protection scope of the disclosure. Therefore, the protection scope of the patent of the disclosure shall be subject to the appended claims.

What is claimed is:

1. A streaming media transmission method, performed by at least one processor and comprising:
   parsing streaming media transmission signaling to obtain a ranking relationship descriptor of each streaming media object, the ranking relationship descriptor comprising (i) a ranking identifier field, (ii) a ranking information field, and (iii) a combination determination field used for representing whether to perform combination and ranking on the streaming media objects, the ranking identifier field being used for representing a ranking range, and the ranking information field being used as a ranking basis;
   forming a ranking relationship set with at least two streaming media objects having the same ranking identifier field;
   ranking, in accordance with the combination determination field, the at least two streaming media objects in the ranking relationship set according to the ranking information field to obtain a streaming media object sequence;
   selecting a to-be-received target streaming media object from the streaming media object sequence; and
   transmitting a streaming media transmission request for the target streaming media object, the streaming media transmission request being used for requesting to acquire the target streaming media object.

2. The method according to claim 1, wherein the ranking the at least two streaming media objects comprises:
   obtaining a combination determination result based on the combination determination field of each of the at least two streaming media objects in the ranking relationship set; and
   ranking the at least two streaming media objects in the ranking relationship set based on the combination determination result and the ranking information field to obtain the streaming media object sequence.

3. The method according to claim 2, wherein the ranking relationship descriptor further comprises a combination identifier field used for representing a combination and ranking range; and the ranking the at least two streaming media objects in the ranking relationship set based on the combination determination result and the ranking information field to obtain the streaming media object sequence comprises:
  combining the at least two streaming media objects based on a combination identifier field of each of the at least two streaming media objects to obtain a combination result based on the combination determination result indicating that combination determination needs to be performed; and
  ranking the at least two streaming media objects based on the combination result and the ranking information field to obtain the streaming media object sequence.

4. The method according to claim 3, wherein the combining comprises:
  combining streaming media objects with the same combination identifier field into a combination object to obtain the combination result, the combination result comprising at least one combination object; and
  the ranking the at least two streaming media objects based on the combination result and the ranking information field to obtain the streaming media object sequence comprises:
  ranking the at least one combination object based on the ranking information field of each of the at least one combination object to obtain a first object sequence based on the at least two streaming media objects are both combined, and using the first object sequence as the streaming media object sequence; and
  ranking the at least one combination object and at least one uncombined streaming media object in the at least two streaming media objects based on the ranking information field to obtain a second object sequence based on the at least one uncombined streaming media object exists, and using the second object sequence as the streaming media object sequence.

5. The method according to claim 2, wherein the ranking the at least two streaming media objects comprises:
  ranking the at least two streaming media objects based on the ranking information field of each of the at least two streaming media objects to obtain the streaming media object sequence based on the combination determination result indicates that combination determination does not need to be performed.

6. The method according to claim 1, wherein the ranking relationship descriptor further comprises a range number field, the range number field being used for representing a number of ranking ranges to which the streaming media object belongs.

7. The method according to claim 1, wherein the ranking information field comprises at least one of quality ranking information, priority ranking information, or undefined ranking information, the quality ranking information being used for representing a ranking level of the streaming media object ranked according to streaming media quality, the priority ranking information being used for representing a ranking level of the streaming media object ranked according to a selection priority, and the undefined ranking information being used for representing a ranking level of the streaming media object ranked according to a specified rule.

8. The method according claim 1, wherein the streaming media object comprises at least one of a bitstream file, an adaptive subset, or a preselection set, the bitstream file being a file object comprising at least one streaming media resource, the adaptive subset being a file object comprising at least one bitstream file, and the preselection set being a file object obtained by combining the bitstream file or the adaptive subset according to a preset rule.

9. The method according to claim 8, wherein the streaming media resource is a point cloud media resource, and the streaming media object comprises a geometry component and an attribute component, the geometry component being an adaptive subset used for representing geometry constituents of point cloud, and the attribute component being an adaptive subset used for representing attribute constituents of point cloud.

10. The method according to claim 1, further comprising:
  acquiring a corresponding ranking range and a corresponding ranking basis of each of at least one streaming media object;
  configuring a ranking identifier field of a ranking relationship descriptor of each of the at least one streaming media object according to the ranking range;
  configuring a ranking information field of the ranking relationship descriptor of each of the at least one streaming media object according to the ranking basis;
  generating a streaming media transmission instruction based on the ranking relationship descriptor of each of the at least one streaming media object;
  transmitting streaming media transmission signaling to a data receiver; and
  returning, in response to a streaming media transmission request corresponding to the streaming media transmission signaling and transmitted by the data receiver, a target streaming media object matching the streaming media transmission request to the data receiver.

11. The method according to claim 10, wherein the acquiring comprises:
  classifying the at least one streaming media object to obtain the corresponding ranking range of each of the at least one streaming media object; and
  ranking streaming media objects belonging to the same ranking range to obtain the corresponding ranking basis of each of the at least one streaming media object.

12. The method according to claim 10, wherein before the transmitting, the method further comprises:
  counting a range number of ranking ranges corresponding to each of the at least one streaming media object; and
  configuring a range number field of a ranking relationship descriptor of each of the at least one streaming media object according to the range number.

13. The method according to claim 10, wherein before the transmitting, the method further comprises:
  acquiring a corresponding component type of each of the at least one streaming media object;
  performing ranking binding determination on the at least one streaming media object based on the component type to obtain a ranking binding determination result configuring a combination identifier field of a ranking relationship descriptor of each to-be-bound streaming media object in a ranking binding relationship according to the ranking binding relationship based on the ranking binding determination result indicating that the to-be-bound streaming media object exists; and
  configuring a combination determination field of the ranking relationship descriptor of the to-be-bound streaming media object according to a target field value.

14. A streaming media transmission apparatus, comprising:
  at least one memory configured to store program code; and at least one processor configured to read the program code and operate as instructed by the program code, the program code comprising:

signaling parsing code configured to cause the at least one processor to parse streaming media transmission signaling to obtain a ranking relationship descriptor of each streaming media object, the ranking relationship descriptor comprising (i) a ranking identifier field, (ii) a ranking information field, and (iii) a combination determination field used for representing whether to perform combination and ranking on the streaming media objects, the ranking identifier field being used for representing a ranking range, and the ranking information field being used as a ranking basis;

object aggregation code configured to cause the at least one processor to form a ranking relationship set with at least two streaming media objects having the same ranking identifier field;

object ranking code configured to cause the at least one processor to rank, in accordance with the combination determination field, the at least two streaming media objects in the ranking relationship set according to the ranking information field to obtain a streaming media object sequence; and request transmission code configured to cause the at least one processor to select a to-be-received target streaming media object from the streaming media object sequence, and transmit a streaming media transmission request for the target streaming media object, the streaming media transmission request being used for requesting to acquire the target streaming media object.

15. The apparatus according to claim 14, wherein the object ranking code is further configured to cause the at least one processor to obtain a combination determination result based on the combination determination field of each of the at least two streaming media objects in the ranking relationship set, and rank the at least two streaming media objects in the ranking relationship set based on the combination determination result and the ranking information field to obtain the streaming media object sequence.

16. The apparatus according to claim 15, wherein the ranking relationship descriptor further comprises a combination identifier field used for representing a combination and ranking range; and the object ranking code is further configured to cause the at least one processor to combine the at least two streaming media objects based on a combination identifier field of each of the at least two streaming media objects to obtain a combination result based on the combination determination result indicates that combination determination needs to be performed, and rank the at least two streaming media objects based on the combination result and the ranking information field to obtain the streaming media object sequence.

17. The apparatus according to claim 15, wherein the program code further comprises:

acquisition code configured to cause the at least one processor to acquire a corresponding ranking range and a corresponding ranking basis of each of at least one streaming media object;

range configuration code configured to cause the at least one processor to configure a ranking identifier field of a ranking relationship descriptor of each of the at least one streaming media object according to the ranking range;

basis configuration code configured to cause the at least one processor to configure a ranking information field of the ranking relationship descriptor of each of the at least one streaming media object according to the ranking basis;

signaling transmission code configured to cause the at least one processor to generate a streaming media transmission instruction based on the ranking relationship descriptor of each of the at least one streaming media object, and transmit streaming media transmission signaling to a data receiver; and object returning code configured to cause the at least one processor to return, in response to a streaming media transmission request corresponding to the streaming media transmission signaling and transmitted by the data receiver, a target streaming media object matching the streaming media transmission request to the data receiver.

18. The apparatus according to claim 17, wherein the acquisition code comprises:

classifying code configured to cause the at least one processor to classify the at least one streaming media object to obtain the corresponding ranking range of each of the at least one streaming media object; and ranking code configured to cause the at least one processor to rank streaming media objects belonging to the same ranking range to obtain the corresponding ranking basis of each of the at least one streaming media object.

19. A non-transitory computer-readable storage medium, storing instructions, which, when executed by at least one processor, cause the at least one processor to:

parse streaming media transmission signaling to obtain a ranking relationship descriptor of each streaming media object, the ranking relationship descriptor comprising (i) a ranking identifier field, (ii) a ranking information field, and (iii) a combination determination field used for representing whether to perform combination and ranking on the streaming media objects, the ranking identifier field being used for representing a ranking range, and the ranking information field being used as a ranking basis;

form a ranking relationship set with at least two streaming media objects having the same ranking identifier field;

rank, in accordance with the combination determination field, the at least two streaming media objects in the ranking relationship set according to the ranking information field to obtain a streaming media object sequence;

select a to-be-received target streaming media object from the streaming media object sequence; and transmit a streaming media transmission request for the target streaming media object, the streaming media transmission request being used for requesting to acquire the target streaming media object.

20. The non-transitory computer-readable storage medium according to claim 19, wherein the instructions further cause the at least one processor to:

acquire a corresponding ranking range and a corresponding ranking basis of each of at least one streaming media object;

configure a ranking identifier field of a ranking relationship descriptor of each of the at least one streaming media object according to the ranking range;

configure a ranking information field of the ranking relationship descriptor of each of the at least one streaming media object according to the ranking basis;

generate a streaming media transmission instruction based on the ranking relationship descriptor of each of the at least one streaming media object;

transmit streaming media transmission signaling to a data receiver; and return, in response to a streaming media transmission request corresponding to the streaming media transmission signaling and transmitted by the data receiver, a target streaming media object matching the streaming media transmission request to the data receiver.

\* \* \* \* \*